US010631117B2

(12) United States Patent
Gao et al.

(10) Patent No.: US 10,631,117 B2
(45) Date of Patent: Apr. 21, 2020

(54) METHOD AND SYSTEM FOR USER EQUIPMENT MANAGING POSITIONING ASSISTANCE DATA FOR WEARABLE DEVICES

(71) Applicant: QUALCOMM Incorporated, San Diego, CA (US)

(72) Inventors: Weihua Gao, San Jose, CA (US); Sai Pradeep Venkatraman, Santa Clara, CA (US); Ju-Yong Do, Cupertino, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 15/635,856

(22) Filed: Jun. 28, 2017

(65) Prior Publication Data

US 2019/0007787 A1  Jan. 3, 2019

(51) Int. Cl.
*H04W 4/024* (2018.01)
*H04W 4/029* (2018.01)
*H04W 4/02* (2018.01)
*H04W 92/18* (2009.01)

(52) U.S. Cl.
CPC ............. *H04W 4/02* (2013.01); *H04W 92/18* (2013.01)

(58) Field of Classification Search
CPC ... H04W 4/00–08; H04W 4/20; H04W 4/203; H04W 4/30; H04W 4/38; H04W 4/80
See application file for complete search history.

(56) References Cited

U.S. PATENT DOCUMENTS

| | | | |
|---|---|---|---|
| 8,331,952 B2 | 12/2012 | Pagonis et al. | |
| 8,787,184 B2 | 7/2014 | Karaoguz et al. | |
| 9,535,164 B2 | 1/2017 | Asrani et al. | |
| 2010/0325194 A1* | 12/2010 | Williamson | H04W 4/02 709/203 |
| 2011/0199917 A1* | 8/2011 | Karaoguz | G01S 5/0284 370/252 |
| 2012/0150327 A1* | 6/2012 | Altman | G06F 19/3418 700/91 |
| 2014/0039804 A1* | 2/2014 | Park; James | A61B 5/0002 702/19 |
| 2014/0039839 A1* | 2/2014 | Yuen | G06K 9/22 702/189 |
| 2014/0073282 A1* | 3/2014 | Kuo | H04W 4/90 455/404.2 |
| 2014/0176475 A1* | 6/2014 | Myers | A61B 5/7455 345/173 |
| 2015/0102960 A1* | 4/2015 | Asrani | G01S 19/48 342/357.31 |
| 2016/0066147 A1* | 3/2016 | Venkatraman | H04W 4/023 455/456.2 |
| 2016/0252622 A1 | 9/2016 | Levin et al. | |

* cited by examiner

*Primary Examiner* — San Htun
(74) *Attorney, Agent, or Firm* — Thien T. Nguyen

(57) ABSTRACT

Disclosed is an apparatus and method for managing assistance data by user equipment. The method may include obtaining positioning assistance data from a server. The method may also include generating, from the obtained positioning assistance data, at least one first subset of positioning assistance data based, at least in part, on positioning capabilities and/or positioning preferences associated with a first device. Furthermore, the method may include transmitting the first subset of positioning assistance data to the first device.

28 Claims, 5 Drawing Sheets

METHOD AND SYSTEM FOR USER EQUIPMENT MANAGING POSITIONING ASSISTANCE DATA FOR WEARABLE DEVICES

FIELD

The subject matter disclosed herein relates generally to mobile device positioning systems and methods.

BACKGROUND

Mobile positioning technologies enable a mobile device to approximate its real world location. A mobile device can utilizes one or more positioning techniques, such as a global navigation satellite system (GNSS) positioning technique, wireless network based positioning (e.g., positioning based on wireless network access points (APs), based on cellular network transmitters, etc.), as well as other positioning techniques. Furthermore, more and more other mobile devices, such as connected or wearable devices (e.g., smart watches, smart glasses, fitness trackers, smart garments, medical devices, gaming devices, etc.), perform device positioning for various purposes.

To make these techniques more efficient and/or accurate, assistance data is often utilized when performing positioning. The positioning assistance data can include various types of information that the mobile device or wearable device may utilize when performing a positioning process, such as identities and locations of wireless network APs, information for acquiring and using GNSS signals, communication protocols, whether an AP is a mobile or stationary AP, as well as other data. To obtain this assistance data, the mobile device performing, or that will perform, the positioning process queries a server for positioning assistance data, downloads the positioning assistance data, and then stores the data at that mobile device. This process may need to be repeated during the positioning process, such as when the mobile device moves locations such that previous assistance data is no longer relevant, when there is a significant passage of time and the previous assistance data is out of date, etc. Furthermore, each mobile device acquires its own positioning assistance data.

The acquisition, monitoring, and processing of the assistance data by the mobile devices are both energy and computationally intensive processes. This becomes even more acute for connected and wearable devices with limited storage for potentially large amounts of assistance data, limited power resources for continually obtaining assistance data, limited bandwidth for accessing an assistance data server, etc.

DETAILED DESCRIPTION

Methods and systems for a user equipment managing positioning assistance data for one or more wearable devices are described. In one embodiment, the user equipment is a mobile telephone, such as a smartphone, and the one or more wearable devices can include a plurality of different types of mobile devices, such as smart watches, smart glasses, fitness trackers, smart garments, medical devices, gaming devices, etc. However, the user equipment may also be a wearable device with sufficient computing, memory, battery, and network resources to perform the processes discussed herein.

In embodiments, the wearable devices are capable of performing one or more types of positioning processes (e.g., GNSS, wireless network, etc. based positioning) and utilizing assistance data (e.g., AP assistance data, GNSS assistance data, cellular network assistance data, etc.) to perform the one or more positioning processes. However, due to the limited capabilities of each wearable device, the user equipment obtains assistance data and manages what specific assistance data is provided to each wearable device, as discussed in greater detail below.

Figure 1:
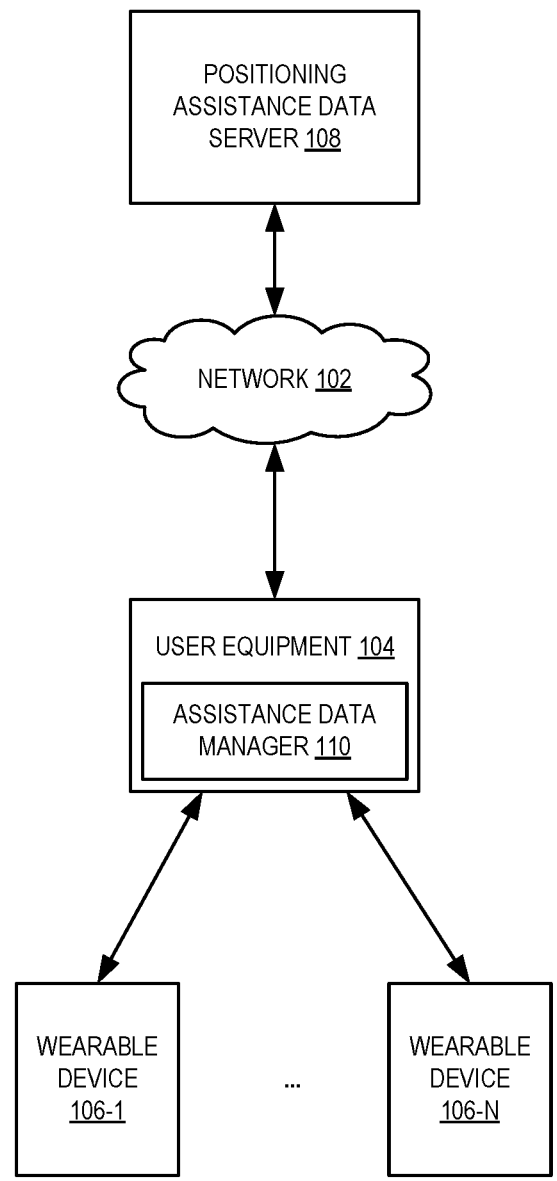
FIG. 1 illustrates one embodiment of a system for utilizing user equipment for obtaining, managing, and providing assistance data to one or more wearable devices.

FIG. 1 illustrates one embodiment of a system 100 for utilizing user equipment 104 for obtaining, managing, and providing assistance data to one or more wearable devices 106-1 through 106-N. In one embodiment, user equipment 104, wearable devices 106-1 through 106-N, and positioning assistance data server 108 are systems, which may include one or more processors, memory, I/O controllers, network interfaces, displays, etc., as discussed in greater detail herein.

In one embodiment, user equipment 104 is communicably coupled with each wearable device 106-1 through 106-N, either continuously or periodically, using any of a plurality of protocols for the exchange of information (e.g., a personal area network connection, a near field communication connection, a physical connection, etc.). Furthermore, each wearable device 106-1 through 106-N performs positioning to determine its location using one or more positioning techniques (e.g., GNSS based, wireless network based, peer-to-peer based, etc.), and performs the positioning independently of the other wearable devices. In one embodiment, each wearable device 106-1 through 106-N may utilize positioning assistance that can include various types of information that the wearable devices 106-1 through 106-N may utilize when performing a positioning process, such as identities and locations of wireless network APs, information for acquiring and using GNSS signals, communication protocols, whether an AP used for positioning purposes is a mobile or stationary AP, as well as other assistance data. Such assistance data is utilized during the positioning processes performed by wearable devices 106-1 through 106-N to, for example, improve the startup performance, positioning accuracy, speed of positioning, etc.

In one embodiment, to facilitate the wearable devices 106-1 through 106-N performing their respective positioning processes, assistance data manager 110 of user equipment 104 requests positioning assistance data from positioning assistance data server 108 via network 102. User equipment 104 and assistance data server 108 are communicably coupled via network 102 (e.g., the Internet, a wide area network, a local area network, or a combination thereof), and communicate with one another to exchange positioning assistance data using any of the standard protocols for the exchange of information.

In one embodiment, assistance data manager 110 of user equipment periodically obtains positioning assistance data from positioning assistance data server 108. In one embodiment, the assistance data obtained by user equipment 104 can include a plurality of different types of positioning assistance data for a plurality of different positioning techniques, assistance data relevant to a large geographic area, assistance data relevant for a large period of time, etc. For example, the assistance data obtained by assistance data manager 110 of user equipment 104 can include cellular network transmitter IDs and their associated locations and signal characteristics, wireless network AP IDs and their associated locations and signal characteristics, GNSS assistance data, personal area network assistance data (e.g., Bluetooth transmitter IDs and locations), as well as other assistance data.

In one embodiment, because the obtained assistance data may include a large amount of data, assistance data manager 110 filters or otherwise reduces the obtained positioning assistance data and provides each wearable device 106-1 through 106-N with a subset of the obtained assistance data. For example, assistance data download manager 110 may obtain hundreds of megabytes of assistance data relevant to different types of positioning techniques for a large geographical region, but only provide wearable device 106-1 with a first subset of the assistance data relevant to a specific radio technology and localized geographical region, and later provide wearable device 106-1 with a second subset of assistance data relevant to a different radio technology and/or localized geographical region. In one embodiment, assistance data manager 110 may provide each wearable device with a different subset of the assistance data at different frequencies based on one or more factors associated with each wearable device (e.g., positioning capabilities and/or positioning preferences of each device). For example, assistance data download manager 110 may limit the subset of assistance data provided to each wearable device based on positioning capabilities of the wearable device (e.g., on what frequency bands the wearable can obtain relevant signals, what radio technology the wearable utilizes, a signal range that the wearable can receive, etc.), based on a positioning use case of the wearable device (e.g., a subset of assistance data corresponding to a preplanned or learned user travel route), based on a desampling criteria (e.g., selection of the most reliable, closest, strongest, etc. signal transmitters based on the wearable's location), based on a learned set of signal sources (e.g., wearable generates a listing of frequently seen signal transmitters, and assistance data download manager 110 provides assistance data relevant to the listed transmitters), based on positing preferences (e.g., how frequently a device is to receive positioning assistance data, a maximum size of positioning assistance data, a precision of positioning assistance data, a type of positioning assistance data, a type of positioning technique, etc.), as well as other assistance data subset selection techniques.

In one embodiment, assistance data manager 110 performs assistance data filtering for different wearable devices based on tracked usage of assistance data. In one embodiment, user equipment 104 and/or a particular wearable device may track positioning assistance data usage used by a particular wearable device to model that wearable device's actual usage assistance data. That is, the user equipment 104 may track frequently seen signal transmitters. Furthermore, each wearable device may track frequently seen signal transmitters. In one embodiment, the user equipment 104 and/or the wearable devices may then rank these transmitters based on various reliability factors including a total number of times a signal was received from a transmitter (e.g., 1, 10, 1000 times in the last month from a specific AP), how frequently a signal from a transmitter is received (e.g., a signal from a specific AP is received 20 times per day vs 1 time per month), how long signals have been received from a transmitter (e.g., an age of signals may be received for only one day, for one week, for the last year, etc.), as well as other factors relevant to reliability of assistance data. The factors enable assistance data download manager 110 to determine positioning usage patterns (e.g., positioning performed frequently along a specific route, positioning performed often at an indoor venue, etc.), in addition to the reliability of positioning assistance data.

In one embodiment, these various usage and reliability data, whether tracked by the user equipment 104 or tracked by different wearable devices, are provided to assistance data manager 110 of user equipment 104. Assistance data manager 110 utilizes the assistance data usage and reliability data to filter assistance data received from positioning assistance data server 108 and provide a select subset of relevant and/or reliable assistance data to each wearable device 106-1 through 106-N. The wearable devices 106-1 through 106-N may then store and subsequently use the positioning assistance data during a positioning process.

In one embodiment, user equipment 104 provides subsets of positioning assistance data to the wearable devices automatically based on the usage and/or reliability data tracked by user equipment 104 and/or wearable devices. Thus, the wearable devices 106-1 through 106-N can utilize their respective selected subsets of positioning assistance data without needing to request such assistance data from user equipment 104. In one embodiment, assistance data manager 110 of user equipment 104 can automatically provide new/updated subsets of positioning assistance data to individual wearable devices based on frequency with which positioning is performed, age of supplied assistance data, time when positioning is typically performed, physical location where positioning is frequently performed, etc. For example, assistance data manager 110 can determine a subset of APs that are frequently used by wearable device 106-1 (e.g., APs corresponding to a route of travel at a specific time of data, APs corresponding to a user's work, etc.). Then, assistance data download manager 110 can automatically provide assistance data relevant to these APs (e.g., at a certain time of day, when user equipment detects a certain location, etc.), which wearable device 106-1 can store and use without having to obtain such assistance data from user equipment 104 and/or without user equipment 104 having to communicate with assistance server 108.

Figure 2:
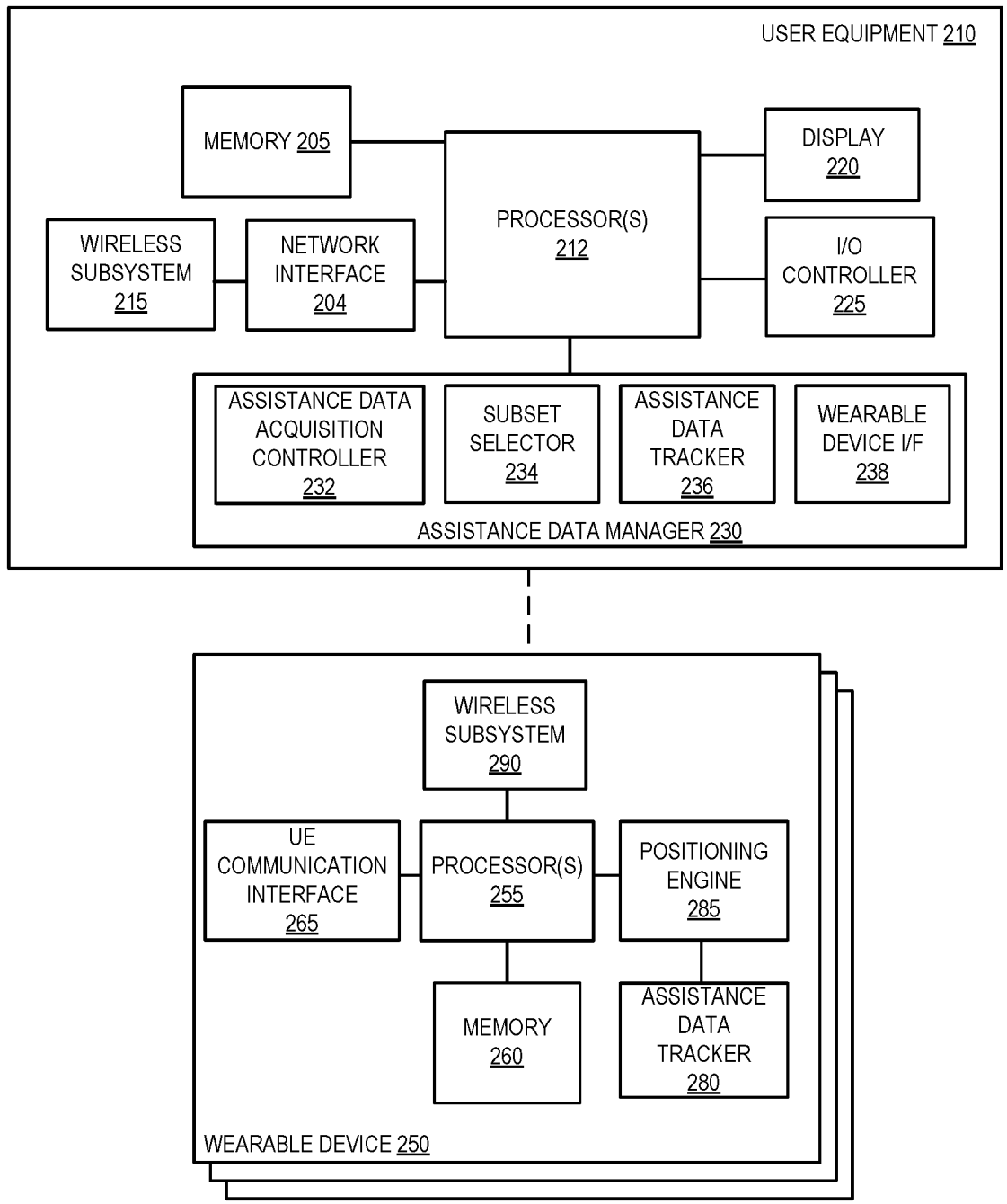
FIG. 2 is block diagram of one embodiment of user equipment and one or more wearable devices.

FIG. 2 is block diagram of one embodiment 200 of user equipment 210 and one or more wearable devices, including wearable device 250. In one embodiment, the user equipment 210 and wearable device 250 provide additional details for the user equipment and wearable device discussed above in FIG. 1.

In one embodiment, user equipment 210 is a system such as a mobile telephone, tablet computer, wearable device, etc., which may include one or more processors 212, a memory 205, a display 220, an input/output controller 225, and network interface 204. User equipment 210 may also include a number of processing modules, which may be implemented as hardware, software, firmware, or a combination, such as the assistance data manager 230, assistance data acquisition controller 232, subset selector 234, assistance data tracker 236, and wearable device interface 238. It should be appreciated that user equipment 210 may also include, although not illustrated, a user interface (e.g., keyboard, touch-screen, or similar devices), a power device (e.g., a battery), as well as other components typically associated with electronic devices. Network interface 204 may also be coupled to a number of wireless subsystems 215 (e.g., Bluetooth, WLAN, WiFi, Cellular, or other networks) to transmit and receive data streams through a wireless link. In one embodiment, wireless subsystem 215 communicatively couples user equipment 210 to a positioning assistance data server (e.g. positioning assistance data server 108 of FIG. 1).

In one embodiment, wearable device 250 is also a system, which may include one or more processor(s) 255, a memory 260, and wireless subsystem 290, and a UE communication interface 265. Wearable device 250 may also include a number of processing modules, which may be implemented as hardware, software, firmware, or a combination, such as positioning engine 285 and assistance data tracker 280. It should be appreciated that wearable device 250 may also include, although not illustrated, a user interface (e.g., keyboard, touch-screen, or similar devices), a power device (e.g., a battery), a display screen (e.g., an LCD display), as well as other components typically associated with wearable or other mobile devices. UE communication interface 265 (e.g., a Bluetooth, WiFi, WLAN, Cellular, or other communication interface) of wearable device 250 utilizes a transfer of wireless subsystem 290 to transmit and receive data, such as positioning assistance data or positioning assistance usage/reliability data, through a wireless link to/from user equipment 210.

In one embodiment, one or both of memory 205 and memory 260 may be coupled to a processor to store instructions for execution by the processors, such as processor (s) 212 and processor(s) 255. In some embodiments, memory 205 is non-transitory. Memory 205 may store one or more modules (i.e., assistance data manager 230, assistance data acquisition controller 232, subset selector 234, assistance data tracker 236, and wearable device interface 238), and memory 260 may also store one or more modules (i.e., positioning engine 285 and assistance data tracker 280), to implement embodiments described herein. It should be appreciated that the embodiments as will be hereinafter described may be implemented through the execution of instructions, for example as stored in memory or other element, by processor(s) 212 of user equipment 210, and/or other circuitry of user equipment 210, by processor(s) 255 of wearable device 250, and/or other devices. Particularly, circuitry of user equipment 210 and wearable device 250, including but not limited to processor(s) 212 and processor(s) 255, may operate under the control of a program, routine, or the execution of instructions to execute methods or processes in accordance with the aspects and features described herein. For example, such a program may be implemented in firmware or software (e.g. stored in memory 205 and/or memory 260) and may be implemented by processors, such as processor(s) 212 and/or processor(s) 255, and/or other circuitry. Further, it should be appreciated that the terms processor, microprocessor, circuitry, controller, etc., may refer to any type of logic or circuitry capable of executing logic, commands, instructions, software, firmware, functionality and the like.

In one embodiment, assistance data manager 230 is responsible for acquiring, tracking, filtering, and providing assistance data to wearable device 250. In one embodiment, positioning assistance data is obtained by assistance data acquisition controller 232 from a positioning assistance data server (e.g., server 108) on a periodic basis, such as daily, hourly, on demand, etc. The acquired positioning assistance data may include assistance data relevant to a plurality of different positioning techniques (e.g., GPS, AP, peer-to-peer, etc.), a large geographic area (e.g., a city, a state, a cell, etc.), etc.

In one embodiment, to avoid providing all of the received assistance data to each wearable device, in one embodiment, subset selector 234 filters the assistance data into one or more subset(s) of the assistance data. The subset(s) may be subset(s) relevant to positioning technique (e.g. a subset relevant to GNSS-based positioning and a subset relevant to AP-based positioning), to geographic location (e.g., stage, city, cell, region, etc.), and/or tracked factors relevant to specific wearable devices (e.g., IDs of frequently used transmitters, location where positioning is performed, time when positioning is performed, task performed during positioning, etc.). In one embodiment, the tracked factors may be tracked by assistance data tracker 236 of assistance data manager 230, such as tracking APs, locations, signal strengths, signal coverage, timing information, etc. These factors are provided to subset selector 234 for use during assistance data filtering to, for example, filter the received positioning assistance data to a subset relevant to a specific time when positioning is performed, a specific location when positioning is performed, a specific technique used to perform positioning, or a combination thereof. The filtered subset of positioning assistance data is provided to wearable device 250 via wearable device interface 238.

In one embodiment, positioning engine 285 of wearable device utilizes the filtered subset of positioning assistance data when performing a positioning process on the wearable device 250. That is, the wearable device 250 utilizes the positioning assistance data to improve positioning accuracy, improve efficiency, improve positioning startup, etc. of the process performed by positioning engine 285. In one embodiment, assistance data tracker 280 monitors the positioning process performed by positioning engine 286 to obtain wearable device specific factors relevant to positioning process(es) performed by wearable device 250. For example, assistance data tracker 280 can track IDs of specific signal transmitters used by positioning engine 285, how frequently certain transmitters are used, signal strengths provide by specific transmitters, time of day when positioning is performed by wearable device 250, location where positioning is performed, task being performed during positioning (e.g., route navigation, step counting, location based search, etc.), as well as other factors relevant to positioning performed by wearable device 250. In one embodiment, this wearable device specific tracked positioning usage data is provided to subset selector 234.

In one embodiment, subset selector 234 combines and/or updates the assistance data usage factors tracked by assistance data tracked 236 with the wearable device specific assistance data usage factors tracked by assistance data tracker 280. The combined tracked usage factors enable subset selector to make an assistance data usage model relevant to each wearable device that accounts for a type of positioning process that is to be performed, when positioning is performed, a task associated with positioning, what signal transmitters are frequently used, what regions positioning is performed at, etc. Each of these factors can therefore be used by subset selector to generate different subsets of positioning assistance data relevant to different wearable devices that may have different positioning capabilities and/or positioning preferences. In other words, the filtered subsets of assistance data limit the assistance data provided to each wearable device based on, for example, capabilities of a wearable device that is to receive a subset of assistance data (e.g., a type of positioning process that will be performed), positioning preferences of a wearable device (e.g., wireless positioning is preferred over GNSS positioning), based on a positioning usage by the wearable device that is to receive a subset (e.g., positioning used for navigation, step counting, search, etc.), based on one or more desampling criteria associated with the wearable device that is to receive the subset (e.g., reducing a list of APs to reliable APs for a specific geographic location), based on a learned set of signal sources that generate frequently received signals, or a combination thereof.

In one embodiment, assistance data usage tracking is provided to subset selector 234 on a periodic basis by each wearable device. Subset selector 234 may therefore adapt the filtering of positioning assistance data to evolving conditions around the wearable device (e.g., changes in signal source reliability, addition/removal of signal sources, etc.), changes in positioning usage patterns, etc. Furthermore, the adapted filtering of positioning assistance data is based on wearable device specific tracking data, and thus the different filtered subsets of assistance data also adapt to the specific needs of different the wearable devices.

Figure 3:
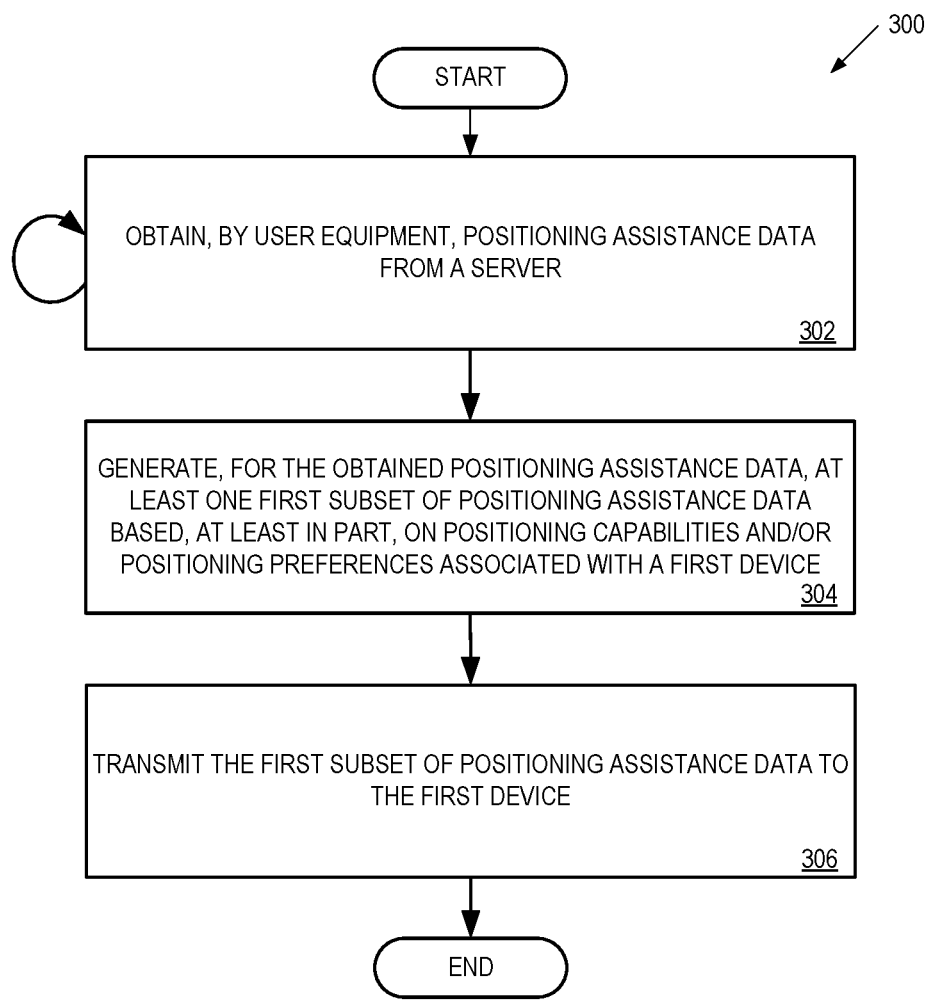
FIG. 3 is a flow diagram of an embodiment of a method for user equipment obtaining and providing assistance data to a wearable device.

FIG. 3 is a flow diagram of one embodiment of a method 300 for user equipment obtaining and providing assistance data to a wearable device. The method 300 is performed by processing logic that may comprise hardware (circuitry, dedicated logic, etc.), software (such as is run on a general purpose computer system or a dedicated machine), firmware, or a combination. In one embodiment, the method 300 is performed by a mobile device (e.g., user equipment 104 or 210).

Referring to FIG. 3, processing logic begins by obtaining positioning assistance data from a server (processing block 302). As discussed herein, the obtained positioning assistance data may be obtained from an assistance data server, an access point, or other source of assistance data, and may be relevant to one of more different types of positioning techniques (e.g. GNSS, wireless network, peer-to-peer, etc. positioning). In embodiments, the amount of positioning data provided by the server may be large, which could be taxing on the limited resources of a device, such as a wearable device, that is to receive the assistance data from the user equipment. Furthermore, the assistance data may include data irrelevant to a specific positioning process that is to be performed by a wearable device (e.g., GNSS assistance data when wearable device prefers to perform an AP based positioning process).

Processing logic filters generates, from the obtained positioning assistance data, at least one first subset of positioning assistance data based, at least in part, on positioning capabilities and/or positioning preferences associated with a first device (processing block 304). As discussed herein, processing logic may generate a filtered or reduced subset of the positioning assistance data based on several different factors related to positioning capabilities and/or preferences of a device that is to receive a particular generated subset of positioning assistance data. For example, a subset of positioning assistance data can be generated based, at least in part on, positioning assistance data usage factors, based on the techniques that will utilize specific subsets of assistance data (e.g., whether a device has the capabilities to perform a GNSS, wireless network, peer-to-peer, hybrid, or other position), based on preferences associated with devices that utilize specific subsets of assistance data (e.g., what type of positioning technique a device prefers regardless of device positioning capabilities, a maximum size of positioning assistance data, a frequency of updates, etc.), as well as other factors. Furthermore, usage factors can be tracked by the user equipment and/or the wearable device that is to receive and use the subset of positioning assistance data. As discussed herein, the different usage factors enable processing logic to model the usage of the positioning assistance data (e.g., what assistance data is used, when is it used, where is it used, what task is it used for, what are the reliable sources of positioning data, etc.) for different wearable devices. In embodiments, the usage factors may be tracked by processing logic to infer positioning preferences associated with a device. Furthermore, these factors are tracked periodically and/or continuously, and may therefore evolve to adapt the generation of different subsets of positioning assistance data by processing logic to the real world positioning environment and usage of a particular wearable device. Thus, processing logic is able to generate a first subset of filtered positioning assistance data for a first wearable device, and generate a second subset of filtered positing assistance data for a second wearable device, where the first and second subset are different with respect to their relevance to different positioning device capabilities (e.g., AP verse GNSS), preferences (e.g., user settings, inferred preferences, etc.), locations (e.g., a first region and a second region), signal sources (e.g., $AP_1$, $AP_2$, and $AP_m$ are reliable and included in the filtered subset, while available $AP_i$ is not included in the filtered subset due to lack of reliability), geographic locations (e.g., assistance data for a cell currently occupied by a wearable device), time of usage (e.g., different assistance data associated with a time spent at work and a time spent at home), associated positioning task (e.g., different assistance data and/or type of assistance data is provided for real time navigation as opposed to location based search), etc.

Processing logic then transmits the first subset of positioning assistance data to the first device (processing block 306). As discussed herein, processing logic may distribute different subsets of positioning assistance data to different devices (e.g., different wearable, mobile, or other devices) based on the factors discussed herein. The different subsets enable different devices to perform different and/or independent positioning processes based on the needs of the particular device. Furthermore, the different filtered subsets may be distributed to each device asynchronously with the positioning processes that will be performed by the respective devices.

Figure 4:
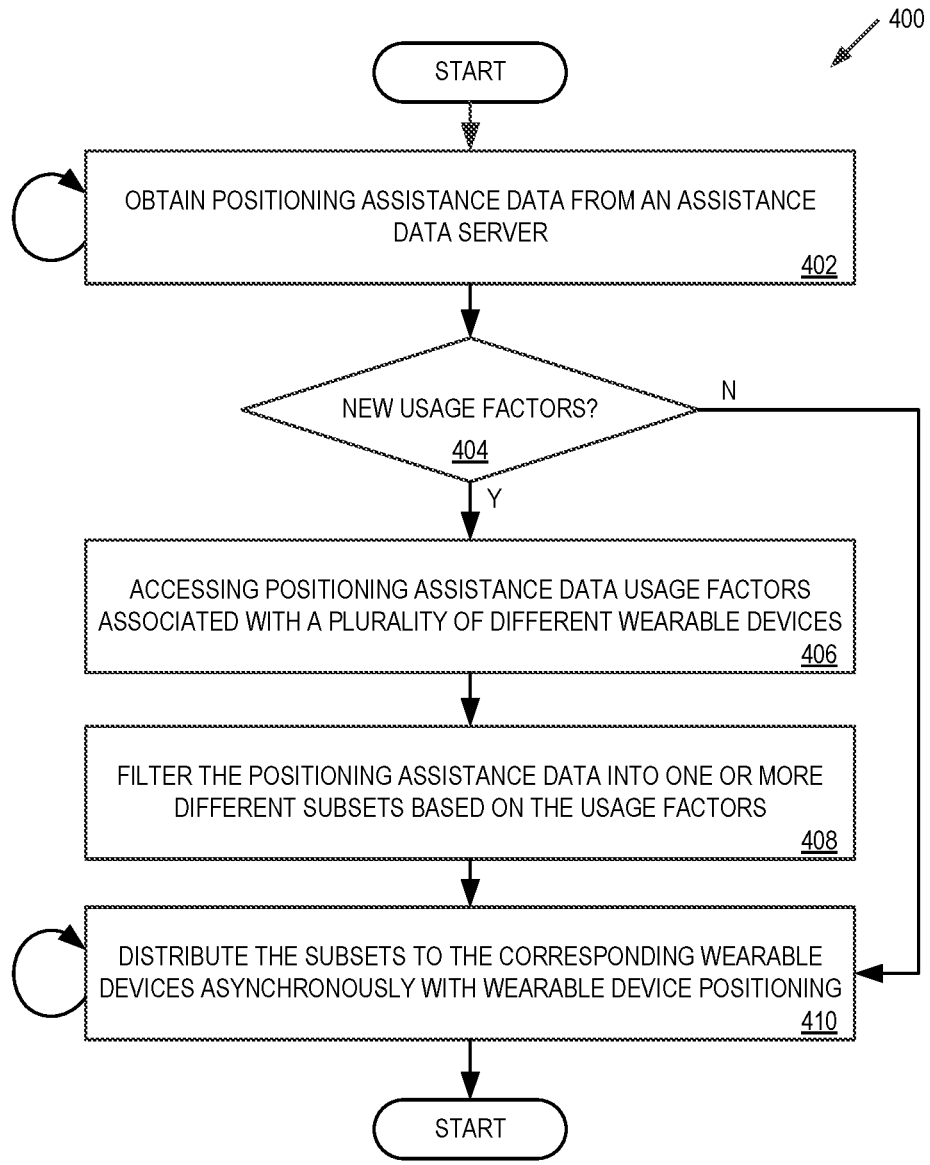
FIG. 4 is a flow diagram of another embodiment of a method for user equipment obtaining and providing assistance data to a wearable device.

FIG. 4 is a flow diagram of another embodiment of a method 400 for user equipment obtaining and providing assistance data to a wearable device. The method 400 is performed by processing logic that may comprise hardware (circuitry, dedicated logic, etc.), software (such as is run on a general purpose computer system or a dedicated machine), firmware, or a combination. In one embodiment, the method 400 is performed by a mobile device (e.g., user equipment 104 or 210).

Referring to FIG. 4, processing logic begins by obtaining positioning assistance data from an assistance data server (processing block 402). The assistance data may be obtained periodically, such as weekly, daily, hourly, etc., and can include positioning assistance data for a plurality of different positioning techniques, geographic regions, etc.

Processing logic determines if there are any new positioning assistance data usage factors (processing block 404). As discussed herein, the positioning assistance usage factors are indicators of how, when, and for what positioning assistance data is used by each individual wearable device. For example, the usage factors can include identifiers of specific signal transmitters used during a positioning process, data indicative of how frequently certain transmitters are used for performing the positioning process, signal strength data associated with signal transmitters, a time of day when positioning is performed by the at least one wearable device, a location where positioning is performed, a task being performed by the at least one wearable device during the positioning process, or any combination of these factors. As discussed herein, the usage factors may be tracked by the wearable devices during the performance of a positioning process, as well as by the user equipment. Furthermore, the tracked usage factors can be tracked with respect to previously distributed filtered positioning assistance data. Thus, processing logic receives feedback, in the form of newly tracked usage factors, from the wearable devices, which provide an indication of new, different, and evolving real time conditions experienced by the wearable devices when performing positioning.

When there are new tracked usage factors, processing logic proceeds to processing block 406 to account for these new usage factors when filtering positioning assistance data into subsets. Otherwise, processing logic proceeds to processing block 410 to distribute already filtered subsets.

At processing block 406, processing logic accesses positioning assistance data usage factors, including any newly received usage factors, associated with a plurality of different wearable devices (processing block 406). Processing logic utilizes the usage factors to filter the positioning assistance data into one or more different subsets of positioning assistance data (processing block 408). The different subsets can include subsets relevant to each wearable device, and can include different positioning assistance data relevant to the factors discussed herein. Processing logic then distributes the subsets to the corresponding wearable devices asynchronously with wearable device positioning (processing block 410). In embodiments, the distribution of subsets of positioning assistance data is distributed asynchronously with wearable device positioning so that the wearable devices have the necessary assistance data stored and ready at the time of performing a positioning process, without having to request, wait to download, and then use the positioning assistance data. Furthermore, the distribution can occur at the same frequency as the obtaining of assistance data at processing block 402. However, the distribution can occur at a different frequency, such as in response to the receipt of new usage factors, discussed below.

Figure 5:
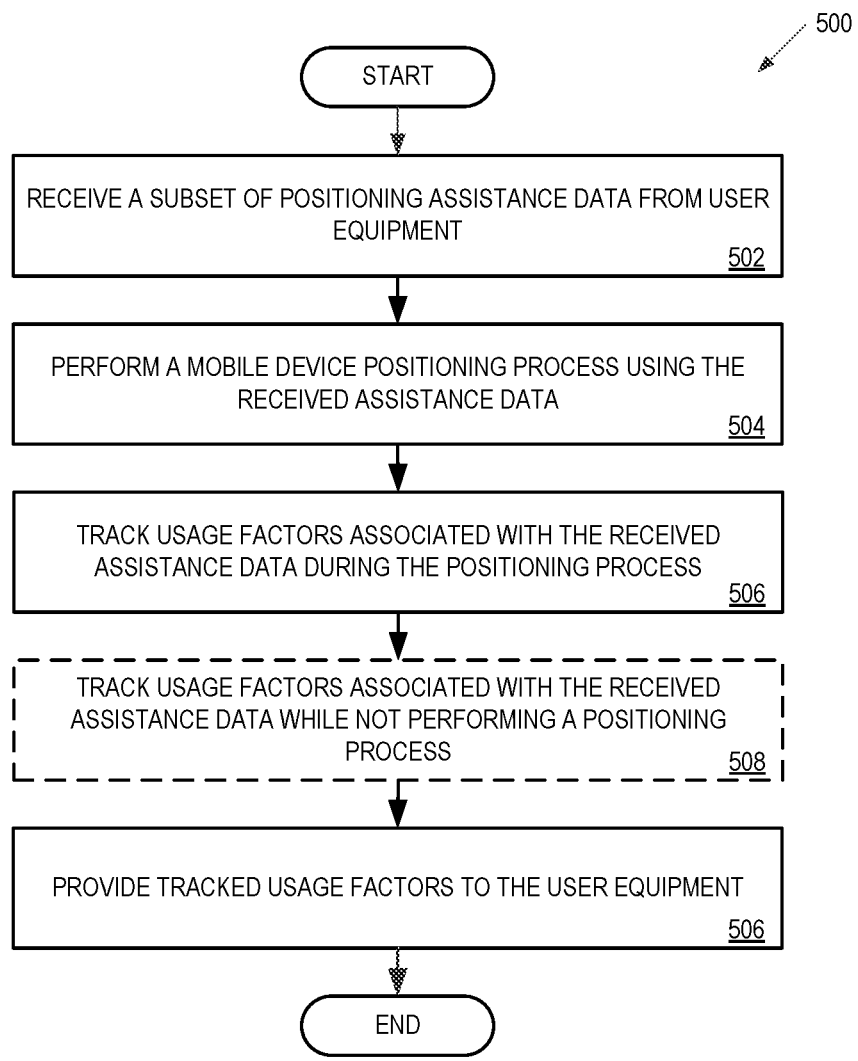
FIG. 5 is a flow diagram of an embodiment of a method for a wearable device performing a positioning process and tracking usage factors associated with positioning assistance data.

FIG. 5 is a flow diagram of an embodiment of a method 500 for a wearable device performing a positioning process and tracking usage factors associated with positioning assistance data. The method 500 is performed by processing logic that may comprise hardware (circuitry, dedicated logic, etc.), software (such as is run on a general purpose computer system or a dedicated machine), firmware, or a combination. In one embodiment, the method 500 is performed by a mobile device (e.g., user equipment 106 or 250).

Referring to FIG. 5, processing logic begins by receiving a subset of positioning assistance data from user equipment (processing block 502). A mobile device positioning process using the received assistance data is performed (processing block 504). As discussed herein, the positioning process may utilize one of a plurality of different positioning techniques (e.g., wireless network based, GNSS based, peer-to-peer based, etc.). Furthermore, the subset of positioning assistance data provides assistance data relevant to the positioning process being performed, as discussed herein.

Processing logic tracks one or more usage factors associated with the received assistance data during the positioning process (processing block 506). That is, processing logic tracks the usage of the various assistance data, such as which signal transmitters identified in the assistance data were used for positioning process, what was the reliability of the signals of the identified transmitters, when was the positioning performed, what task was the wearable device performing during the position, time when positioning was performed, what type of positioning process was performed and what are the positioning capabilities of a device, as well as other factor discussed herein. Furthermore, processing logic may optionally track usage factors associated with the received assistance data while not performing a positioning process (processing block 508). That is, process logic may track one or more of the factors discussed herein, such as signal transmitter visibility, signal strength, etc., even when not performing positioning.

Processing logic then provides the tracked usage factors to the use user equipment (processing block 510). As discussed herein, the tracked usage factors are used for generating one or more filtered subsets of positioning assistance data based inferred positioning preferences, how positioning data is used during device positioning, etc., and for the distribution of one or more appropriate subsets of positioning assistance data to different devices.

It should be appreciated that when the devices discussed herein include mobile devices (e.g., user equipment and/or wearable devices), that the mobile devices may communicate via one or more wireless communication links through a wireless network that are based on or otherwise support any suitable wireless communication technology. For example, in some aspects mobile devices and/or wearable devices may associate with a network including a wireless network. In some aspects the wireless connections discussed herein form networks, which may comprise a body area network, a personal area network (e.g., an ultra-wideband network), as well as other types of networks. In some aspects the network may comprise a local area network or a wide area network. A wireless device may support or otherwise use one or more of a variety of wireless communication technologies, protocols, or standards such as, for example, CDMA, GSM, WCDMA, LTE, TD-SCDMA, TDMA, OFDM, OFDMA, WiMAX, and Wi-Fi. Similarly, a wireless device may support or otherwise use one or more of a variety of corresponding modulation or multiplexing schemes. A mobile wireless device may wirelessly communicate with other mobile devices, cell phones, wearable devices, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant (PDA), a tablet, a mobile computer, a laptop computer, a tablet, an entertainment device (e.g., a music or video device), a fitness device (e.g., a biometric sensor, a pedometer, etc.), a wearable device (e.g., a smartwatch), a smart system (e.g., a smart appliance, a smart automobile, a smart robot, or other smart device), or any other suitable device.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments described herein.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of non-transitory computer-readable media.

The previous description is provided so that any person skilled in the art can make or use the embodiments described herein. Various modifications to these embodiments will be readily apparent to those skilled in the art, and the generic principles defined herein may be applied to other embodiments without departing from the spirit or scope of the described embodiments. Thus, the aspects and features described herein are not intended to be limited, but are to be accorded the widest scope consistent with the principles and novel features disclosed herein.

What is claimed is:

1. A method for managing assistance data by a user equipment, the method comprising:
    obtaining, by the user equipment, positioning assistance data from a server, wherein the positioning assistance data comprises information to be utilized by one or more devices, including a first device, for performing location determination of the one or more devices;
    filtering, based on tracked positioning assistance data usage factors, the obtained positioning assistance data to generate a plurality of different subsets of the obtained positioning assistance data, including a first subset of the obtained positioning assistance data and a second subset of the obtained positioning assistance data, based on a plurality of positioning capabilities and/or positioning preferences associated with the one or more devices, wherein the tracked positioning assistance data usage factors indicate previous usage of positioning assistance data by the first device;
    transmitting the first subset of positioning assistance data to the first device, based on a first positioning technique to be performed by the first device and/or based on a first positioning preference of the first device, and
    transmitting the second subset of the obtained positioning assistance data to a second device, based on a second positioning technique to be performed by the second device and/or based on a second positioning preference of the second device,
    wherein the first subset of the obtained positioning assistance data is different from the second subset of the obtained positioning assistance data.

2. The method of claim 1, wherein the first device and the second device perform independent positioning processes using the first subset of the obtained positioning assistance data and the second subset of the obtained positioning assistance data, respectively.

3. The method of claim 1, wherein the first subset of the obtained positioning assistance data is used by the first device when performing a first positioning technique and the second subset of the obtained positioning assistance data is used by the second device when performing a second positioning technique, and wherein the first positioning technique and the second positioning technique are different positioning techniques.

4. The method of claim 1, wherein the filtering comprises reducing the positioning assistance data obtained from the server to generate the first subset; and
wherein the tracked positioning assistance data usage factors are based on: positioning capabilities of a device that is to receive the subset, intended usage of positioning assistance data by the device that is to receive the subset, one or more desampling criteria associated with the device that is to receive the subset, a learned set of signal sources that generate frequently received signals, or a combination thereof.

5. The method of claim 1, wherein the method comprises receiving the tracked positioning assistance data usage factors from the first device.

6. The method of claim 1, wherein the tracked positioning assistance data usage factors are based on: identifiers of specific signal transmitters used during a positioning process, data indicative of how frequently certain transmitters are used for performing the positioning process, signal strength data associated with signal transmitters, a time of day when positioning is performed by the at least one device, a location where positioning is performed, a task being performed by the at least one device during the positioning process, or a combination thereof.

7. The method of claim 1, wherein the user equipment comprises a mobile telephone.

8. The method of claim 1, wherein the user equipment comprises a wearable device.

9. The method of claim 8, wherein the wearable device comprises one of a smart watch, a fitness tracker, a gaming system, smart glasses, or a medical device.

10. The method of claim 1, wherein the filtering is based, at least in part, on positioning techniques that the first device is capable of performing comprising a GNSS based positioning process, a wireless network based positioning process, a peer-to-peer positioning process, a hybrid positioning process, or a combination thereof.

11. The method of claim 1, wherein the filtering is based, at least in part, on one or more preferred positioning techniques regardless of additional positioning techniques the first device is capable of performing, preferred positioning assistance data types, a preferred size of positioning assistance data transmitted to the first device, a preferred range of positioning assistance data, a preferred frequency with which positioning assistance data is to be updated, or a combination thereof.

12. The method of claim 1, wherein the tracked positioning assistance data usage factors indicate usage of positioning assistance data previously transmitted to the first device.

13. A user equipment system for managing assistance data, the system comprising:
a transceiver to obtain positioning assistance data from a server, wherein the positioning assistance data comprises information to be utilized by one or more devices, including a first device, for performing location determination of the one or more devices;
a memory coupled with the transceiver to store the positioning assistance data; and
a processor coupled with the memory and the transceiver, wherein the processor is configured to:
filter, based on tracked positioning assistance data usage factors, the obtained positioning assistance data to generate a plurality of different subsets of the obtained positioning assistance data, including a first subset of the obtained positioning assistance data and a second subset of the obtained positioning assistance data, based on a plurality of positioning capabilities and/or positioning preferences associated with the one or more devices, wherein the tracked positioning assistance data usage factors indicate previous usage of positioning assistance data by the first device,
cause the transceiver to transmit the first subset of the obtained positioning assistance data to the first device, based on a first positioning technique to be performed by the first device and/or based on a first positioning preference of the first device, and
cause the transceiver to transmit the second subset of the obtained positioning assistance data to a second device, based on a second positioning technique to be performed by the second device and/or based on a second positioning preference of the second device,
wherein the first subset of the obtained positioning assistance data is different from the second subset of the obtained positioning assistance data.

14. The system of claim 13, wherein the first device and the second device perform independent positioning processes using the first subset of the obtained positioning assistance data and the second subset of the obtained positioning assistance data, respectively.

15. The system of claim 13, wherein the first subset of the obtained positioning assistance data is used by the first device when performing a first positioning technique and the second subset of the obtained positioning assistance data is used by the second device when performing a second positioning technique, and wherein the first positioning technique and the second positioning technique are different positioning techniques.

16. The system of claim 13, wherein the processor configured to filter the obtained positioning assistance data comprises the processor configured to reduce the positioning assistance data obtained from the server to generate the first subset; and
wherein the tracked positioning assistance data usage factors are based on: positioning capabilities of a device that is to receive the subset, intended usage of positioning assistance data by the device that is to receive the subset, one or more desampling criteria associated with the device that is to receive the subset, a learned set of signal sources that generate frequently received signals, or a combination thereof.

17. The system of claim 13, wherein the processor is configured to receive the tracked positioning assistance data usage factors from the first device.

18. The system of claim 13, wherein the tracked positioning assistance data usage factors are based on: identifiers of specific signal transmitters used during a positioning process, data indicative of how frequently certain transmitters are used for performing the positioning process, signal strength data associated with signal transmitters, a time of day when positioning is performed by the at least one device, a location where positioning is performed, a task being performed by the at least one device during the positioning process, or a combination thereof.

19. The system of claim 13, wherein the user equipment system comprises a mobile telephone.

20. The system of claim 13, wherein the user equipment system comprises a wearable device.

21. The system of claim 20, wherein the wearable device comprises one of a smart watch, a fitness tracker, a gaming system, smart glasses, or a medical device.

22. The system of claim 13, the processor is configured to filter the obtained positioning assistance data based, at least in part, on positioning techniques that the first device is capable of performing comprising a GNSS based positioning process, a wireless network based positioning process, a peer-to-peer positioning process, a hybrid positioning process, or a combination thereof.

23. The system of claim 13, wherein the processor is configured to filter the obtained positioning assistance data based, at least in part, on one or more preferred positioning techniques regardless of additional positioning techniques the first device is capable of performing, preferred positioning assistance data types, a preferred size of positioning assistance data transmitted to the first device, a preferred range of positioning assistance data, a preferred frequency with which positioning assistance data is to be updated, or a combination thereof.

24. A system, comprising:
    means for obtaining, by a user equipment, positioning assistance data from a server, wherein the positioning assistance data comprises information to be utilized by one or more devices, including a first device, for performing location determination of the one or more devices;
    means for filtering, based on tracked positioning assistance data usage factors, the obtained positioning assistance data to generate a plurality of different subsets of the obtained positioning assistance data, including a first subset of the obtained positioning assistance data and a second subset of the obtained positioning assistance data, based on a plurality of positioning capabilities and/or positioning preferences associated with the one or more devices, wherein the tracked positioning assistance data usage factors indicate previous usage of positioning assistance data by the first device;
    means for transmitting the first subset of the obtained positioning assistance data to the first device, based on a first positioning technique to be performed by the first device and/or based on a first positioning preference of the first device, and
    means for transmitting the second subset of the obtained positioning assistance data to a second device, based on a second positioning technique to be performed by the second device and/or based on a second positioning preference of the second device,
    wherein the first subset of the obtained positioning assistance data is different from the second subset of the obtained positioning assistance data.

25. The system of claim 24, wherein the first device and the second device perform independent positioning processes using the first subset of the obtained positioning assistance data and the second subset of the obtained positioning assistance data, respectively.

26. The system of claim 24, wherein the means for filtering the obtained positioning assistance data comprises means for reducing the positioning assistance data obtained from the server to generate the first subset; and
    wherein the tracked positioning assistance data usage factors are based on: positioning capabilities of a device that is to receive the subset, intended usage of the assistance data by the device that is to receive the subset, one or more desampling criteria associated with the device that is to receive the subset, a learned set of signal sources that generate frequently received signals, or a combination thereof.

27. The system of claim 24, wherein the system comprises means for receiving the tracked positioning assistance data usage factors from the first device.

28. A non-transitory computer readable storage medium including instructions that, when executed by a processor, cause the processor to perform a method for managing assistance data by user equipment, the method comprising:
    obtaining, by the user equipment, positioning assistance data from a server, wherein the positioning assistance data comprises information to be utilized by one or more devices, including a first device, for performing location determination of the one or more devices;
    filtering, based on tracked positioning assistance data usage factors, the obtained positioning assistance data to generate a plurality of different subsets of the obtained positioning assistance data, including a first subset of the obtained positioning assistance data and a second subset of the obtained positioning assistance data, based on a plurality of positioning capabilities and/or positioning preferences associated with the one or more devices, wherein the tracked positioning assistance data usage factors indicate previous usage of positioning assistance data by the first device;
    transmitting the first subset of positioning assistance data to the first device, based on a first positioning technique to be performed by the first device and/or based on a first positioning preference of the first device, and
    transmitting the second subset of the obtained positioning assistance data to a second device, based on a second positioning technique to be performed by the second device and/or based on a second positioning preference of the second device,
    wherein the first subset of the obtained positioning assistance data is different from the second subset of the obtained positioning assistance data.

* * * * *